United States Patent [19]

Cávezzan

[11] Patent Number: 4,595,739
[45] Date of Patent: Jun. 17, 1986

[54] α-KETONE ACETYLENIC INHIBITED PLATINUM GROUP METAL CATALYZED ORGANOPOLYSILOXANE COMPOSITIONS

[75] Inventor: Jacques Cávezzan, Villeurbanne, France

[73] Assignee: Rhone-Poulenc Specialites Chimiques, Courbevoie, France

[21] Appl. No.: 665,448

[22] Filed: Oct. 26, 1984

[30] Foreign Application Priority Data

Oct. 26, 1983 [FR] France ................. 83 17053

[51] Int. Cl.[4] ............................................. C08L 83/05
[52] U.S. Cl. .................................... 528/15; 428/447; 525/478; 528/31; 528/32
[58] Field of Search ................ 525/478; 528/15, 31, 528/32; 428/447

[56] References Cited

U.S. PATENT DOCUMENTS 3,445,420  5/1969  Kookootsedes et al. ........... 525/478
4,347,346  8/1982  Eckberg ............................... 528/32

FOREIGN PATENT DOCUMENTS 0091291  10/1983  European Pat. Off.
1324312   3/1963   France .
2433030   3/1980   France .

Primary Examiner—Wilbert J. Briggs, Sr.
Attorney, Agent, or Firm—Burns, Doane, Swecker & Mathis

[57] ABSTRACT

Curable organopolysiloxane compositions useful, e.g., for the production of anti-stick coatings, comprise (1) an organopolysiloxane, (2) an organohydropolysiloxane, (3) a platinum group metal hardening catalyst, and (4) a platinum catalysis inhibitor comprising an acetylenic α-ketone in an amount which inhibits gelation at ambient temperatures but does not prevent cross-linking at temperatures in excess thereof.

14 Claims, No Drawings

α-KETONE ACETYLENIC INHIBITED PLATINUM GROUP METAL CATALYZED ORGANOPOLYSILOXANE COMPOSITIONS

BACKGROUND AND FIELD OF THE INVENTION

The present invention relates to novel organosiloxane compositions comprising a platinum group metal hardening catalyst and a ketone compound transitory inhibitor therefor. More especially, this invention relates to organopolysiloxane compositions which are stable for appreciable periods of time at ambient temperature, which period of stability is varied depending upon the field of use to which a given composition is to be put, which compositions harden under appropriate curing conditions (heat treatment, treatment with U.V. or infra-red rays, treatment with ionizing radiation, and the like). This hardening or curing is carried out via the well-known reactions of ≡SiH groups with unsaturated olefin radicals bonded to silicon atoms, such reactions being catalyzed by a platinum group metal.

The subject compositions are generally stored before use in the form of two-component or two-pack compositions, the two components being intimately mixed immediately before use to form a single composition, and the principal problem is to avoid premature gelation of such compositions. It is hence necessary that these compositions incorporate a transitory inhibitor for the catalyst, which inhibitor inhibits or retards the catalytic activity at ambient temperature, but whose inhibitory activity disappears at elevated temperatures during the treatment for cross-linking of the compositions.

SUMMARY OF THE INVENTION

Accordingly, a major object of the present invention is the provision of improved organopolysiloxane compositions which can be stored in two-component form and which comprise Si-vinyl ≡SiH radicals and a platinum group metal curing catalyst, which compositions, at point in time of their use after intimate admixture of said two components, do not exhibit inopportune or premature gelation for appropriate periods of time and thus have useful pot or bath lives, said premature gelation being avoided by the presence therein of a ketone compound which inhibits the activity of the platinum group metal catalyst at non-curing temperatures.

Another object of the present invention is the provision of organopolysiloxane compositions of the above type in which the inhibitor, in the intended applications thereof, efficiently retards the catalytic cross-linking activity of the catalytic platinum complex at temperatures lower than the cross-linking temperatures of such compositions, but whose inhibitory influence is insufficient to prevent effective cross-linking at elevated temperatures.

Another object of this invention is the provision of compositions of the above type which may be used to form cross-linked compositions in the form of resins, elastomers, gels or foams, and which are stored before use, preferably under protection from air, as 2 components, one of the 2 components incorporating the catalyst, but which organopolysiloxanes are facilely cross-linked into elastomers after the 2 components have been mixed and heated to a temperature above 80° C., the mixture of the 2 components having, prior to being heated, a pot life of more than several hours and not unusually up to several days, and even several weeks.

Such compositions are especially useful for coating metal articles or for insulation of electrical equipment with or without fillers and which cross-link into elastomers having admirable mechanical strengths and flexibility.

Yet another object of the present invention is the provision of a novel catalyst inhibitor of the above type which is non-toxic and non-lachrymatory.

Still another object of the present invention is the provision of coating compositions of the above type which are devoid of fillers, which contain or do not contain any solvent material, and which are capable of rendering a substrate such as metal foils, glass, plastic or paper, non-adherent to other materials to which they would normally adhere. The subject compositions also impart excellent anti-stick properties, after the cross-linking thereof, to supports or substrates coated, therewith, which properties are preserved with the passage of time, the hardened or cross-linked layers having a good resistance to friction and, in particular, are not removed by abrasion upon conveying the coated supports over the guide rollers of coating or adhesive-applying machines.

In the description which follows, the percentages and parts are all expressed by weight, except where otherwise indicated.

It is recognized that a number of inhibitors for the platinum group metal catalysts are already known to this art, such inhibitors being used either alone or in combination and which in part relate to the satisfaction of certain of the objectives envisaged by the present invention.

Thus, the prior art has proposed for such purposes, for example, alkylthioureas (U.S. Pat. No. 3,188,299), triallylisocyanurates (U.S. Pat. No. 3,882,083), dialkylacetylenedicarboxylates (U.S. Pat. No. 4,347,346), diallylmaleates (U.S. Pat. No. 4,256,870), and a linear or cyclic alkylvinylsiloxane as described in U.S. Pat. Nos. 3,516,946 and 3,775,452 and in French Pat. No. 1,548,775.

In U.S. Pat. No. 3,445,420, there is described an acetylenic organic inhibitor having a boiling point of at least 25° C. and having at least one —C≡C— group, such acetylenic compound being devoid of nitrogen, carboxyl groups, phosphorus, mercapto groups and carbonyl groups in the α-position relative to the carbon atoms constituting the site of acetylenic unsaturation.

It has now unexpectedly been discovered, however, that organic acetylenic compounds which necessarily have a carbonyl group in the α-position relative to the carbon atoms comprising the site of acetylenic unsaturation, and which are also devoid of nitrogen and phosphorus atoms and carboxyl and mercapto groups in the α-position relative to the carbon atoms constituting the site of acetylenic unsaturation, have a platinum inhibitory effect in Si-vinyl≡SiH organopolysiloxane compositions, which effect is quite notable and satisfies all of the objectives of the present invention.

Briefly, the present invention features organopolysiloxane compositions comprising:

(1) at least one organopolysiloxane having at least one vinyl radical per molecule, the remaining radicals either being mono- or divalent organic radicals which do not adversely affect the platinum catalysis;

(2) at least one organohydropolysiloxane containing at least 3 hydrogen atoms bonded to a silicon atom per molecule, the remaining radicals either being mono- or divalent organic radicals, preferably devoid of aliphatic unsaturation, and also not adversely affecting the platinum catalysis;

(3) a catalyst which is a platinum group metal complex, in catalytically effective amounts which catalyze the reaction of the organopolysiloxane (1) with the organohydropolysiloxane (2); and (4) at least one platinum catalysis inhibitor comprising an organic compound having a boiling point of at least 25° C. and at least one site of acetylenic unsaturation, and also having a carbonyl group in the α-position relative to the carbon atoms constituting the site of acetylenic unsaturation, the said inhibitor (4) being present in sufficient amounts to inhibit premature gelation of the compositions at ambient temperature, but in amounts insufficient to prevent the cross-linking thereof at higher temperatures.

DETAILED DESCRIPTION OF THE INVENTION

More particularly according to the present invention, the organopolysiloxanes (1) advantageously comprise recurring structural units having the average general formula:

in which each R denotes a radical selected from among a monovalent hydrocarbon radical having from 1 to 12 carbon atoms, a monovalent halogenated hydrocarbon radical having from 1 to 12 carbon atoms, a cyanoalkyl radical having from 3 to 4 carbon atoms, a cycloalkyl or halogenocycloalkyl radical having from 3 to 8 carbon atoms and containing from 1 to 4 chlorine and/or fluorine atoms, and an aryl, alkylaryl or halogenoaryl radical having from 6 to 8 carbon atoms and containing from 1 to 4 chlorine and/or fluorine atoms, with R preferably being a methyl radical, and R' denotes an alkenyl radical selected from among vinyl, allyl, methallyl, butenyl or pentenyl radicals, or an alkynyl radical selected from among an ethynyl, propynyl or butynyl radical. R' preferably is the vinyl or allyl radical, and still more preferably is the vinyl radical; e and f have the same definitions as for the below compound (II).

The organohydropolysiloxanes (2) advantageously comprise recurring structural units having the average general formula:

in which R has the same definition as above, e is a number ranging from 0.5 to 2.49, f is a number ranging from 0.001 to 1, and the sum of e plus f ranges from 1 to 2.5.

The polymers of the formula (I) are well known to this art and are described, in particular, in U.S. Pat. Nos. 3,220,972, 3,344,111 and 3,434,366.

A representative copolymer has the following general formula (III):

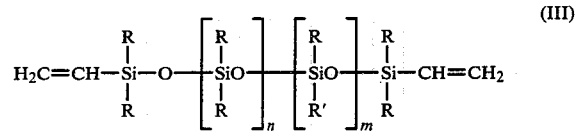

in which R is preferably a methyl group and R' a vinyl group, the viscosity of the polymer ranges from 40 to 100,000 mPa.s at 25° C., and n and m are integers selected such that the content of vinyl groups does not exceed 10% by weight, and preferably 3%, with m optionally being equal to 0.

The organohydropolysiloxanes (2) include fluid materials which preferably do not comprise an olefinic double bond, but which indeed comprise at least 3 hydrogen atoms per molecule in the form of the ≡Si—H group. Such polymers (2) are, for example, described in U.S. Pat. Nos. 3,220,972, 3,341,111 and 3,436,366.

The organohydropolysiloxanes (2), moreover, can either be linear or cyclic in nature.

A representative linear copolymer has the following general formula (IV):

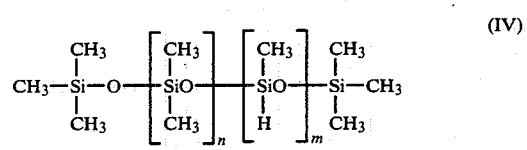

wherein the viscosity of the polymer ranges from 40 to 100,000 mPa.s and n and m are integers such that the content of hydrogen atoms bonded to silicon does not exceed 1.67% by weight and preferably ranges from 0.1 to 1.6% by weight, with n optionally being equal to 0.

The ratio between the hydrogen atoms bonded to silicon in the organohydropolysiloxanes (2) and the sum of the vinyl, alkenyl and alkynyl radicals bonded to silicon in the organopolysiloxanes (1) is advantageously at least 0.5 : 1.

The present invention features compositions of the above type, the intimate admixture of the four (4) components of which produce, after heating to a temperature above 80° C., preferably above 100° C., cross-linked compositions in the form of resins, elastomers, gels or foams, said admixture exhibiting no untimely or premature cross-linking for several hours, generally several days and sometimes several weeks. The inhibitors and the catalysts which may be employed are the same as those described below with respect to the coating compositions. When the ratio of the hydrogen atoms which are bonded to silicon in the organohydropolysiloxanes (2) to the sum of the vinyl, alkenyl and alkynyl radicals which are bonded to silicon in organopolysiloxanes (1) is less than 0.5, the cross-linking is characteristically insufficient. This ratio may be greater than 2 when it is desired to produce elastomer foams.

The usual fillers and additives may be added to reduce shrinkage during cross-linking and to improve mechanical properties, weather resistance, fire resistance, and the like. It is thus possible, for example, to add fumed silica, precipitated silica, ballotini, alumina, iron oxide, carbon black, calcium carbonate, magnesium carbonate, pigments, antioxidants, and the like. When the composition contains fillers, particularly silica, it is advantageous that they be treated with a silazane, for example, hexamethyldisilazane. The quantity of inhibitor may advantageously range from 0.01 to 3%, preferably from 0.05 to 0.5% relative to the total weight of the composition.

The compositions of the invention typically exhibit a strong inhibition to hardening, whether they be used as such or diluted in a solvent. When they are dispersed or diluted in a solvent, a volatile organic solvent is used which is compatible with the composition, selected, for example, from among the alkanes, petroleum cuts which contain paraffinic compounds, toluene, heptane, xylene, isopropanol, methyl isobutyl ketone, tetrahydrofuran, chlorobenzene, chloroform, 1,1,1-trichloroethane, and derivatives of monoethylene glycol and of methylene glycol.

The solvent preferably comprises from 50 to 99% by weight of the dispersion.

By evaporating the solvent from the dispersion, the composition hardens and such dispersions are therefore useful as coating compositions for metal, wood and glass articles and for flexible paper sheets, plastic, and the like.

The compositions of the invention can also be employed as solvent-free compositions which can be used to render materials such as metal foils, glass, plastics or paper, non-adherent to other materials to which it would normally adhere, and, in the case of a solvent-free composition, same advantageously has a viscosity not exceeding 5,000 mPa.s, and which preferably ranges from 10 to 4,000 mPa.s at 25° C., and the ratio between the hydrogen atoms bonded to silicon in the organohydropolysiloxanes (2) and the sum of the vinyl, alkenyl and alkynyl radicals bonded to silicon in the organopolysiloxanes (1) is at least 0.5:1 and typically is less than 2:1, such ratio also being applicable to the resins with solvent.

The invention therefore also features a process which enables sheets of flexible material to be made non-adherent to surfaces to which they normally adhere, which process is characterized in that it comprises applying a quantity of composition according to the invention, generally from 0.1 to 5 g per m² of surface to be coated, and then cross-linking the composition by any suitable means.

The gelation times of these compositions, whether diluted or not, can be greater than 20 hours at ambient temperature, and the catalyst is reactivated at a higher temperature, typically exceeding 80° C.

The solvent-free, namely, the undiluted compositions are applied by means of devices which are suitable for depositing small amounts of liquids in a uniform manner. For this purpose, there may be used the so-called "transfer coating" devices which incorporate, in particular, 2 superimposed rollers: the function of the lower roller, which dips into the coating bath in which the subject compositions are present, is to impregnate the upper roller with a very thin layer, and the function of the latter roller is to then deposit onto the paper the desired amounts of the compositions with which it is impregnated, such proportioning of amounts being achieved by adjustment of the respective speed of the two rollers which rotate in directions opposite to one another.

The diluted compositions, namely, those comprising a solvent, can be applied by means of devices used on industrial machines for coating paper, such as the engraved "Mille point" roller and machines for the so-called reverse roll system. Once deposited on the supports, the compositions are hardened in a few seconds by passage through tunnel furnaces heated to 60°–200° C., the residence time in these furnaces varying typically from 2 to 30 seconds. This time depends, for a given oven length, on the speed at which the coated supports travel (this speed can exceed 200 meters per minute); generally, a support consisting of cellulose material circulates faster (for example, at a speed of 3 m/second for a temperature above 140° C.) than a plastic-based support. In fact, this latter cannot withstand the effects of high temperatures and it is therefore subjected to a lower temperature, but for a longer period, for example, it will travel at a speed of 0.75 m/second for a temperature on the order of 80° C.

The amounts of the compositions deposited onto the supports are variable, and range most frequently from 0.1 to 5 g/m² of surface treated. These amounts depend upon the nature of the supports and the non- or anti-stick properties desired. Such amounts most advantageously range from 0.5 to 1.5 g/m² for non-porous supports.

The compositions can also comprise a cycloorganopolysiloxane compound having vinyl and methyl groups, preferably in the form of a tetramer such as, for example, 1,3,5,7-tetramethyl-1,3,5,7-tetravinylcyclotetrasiloxane.

The compositions according to the invention advantageously also comprise, per 100 parts by weight of the organopolysiloxanes (1) and the organohydropolysiloxanes (2), from 1 to 20 parts by weight of a linear polysiloxane which performs the function of coupling agent or chain lengthener and which comprises an organosiloxane containing 2 hydrogen atoms bonded to silicon per molecule, no silicon atom having more than one hydrogen atom bonded to it, and the 2 hydrogen atoms preferably being attached to the terminal silicon atoms of the siloxane, the organic radicals of such organosiloxane being selected from among the methyl, ethyl, phenyl and 3,3,3-trifluoropropyl radicals.

Exemplary catalysts are complexes of a platinum group metal, especially the platinum-olefin complexes as described in U.S. Pat. Nos. 3,159,601 and 3,159,662, the products of reaction of platinum derivatives with alcohols, aldehydes and ethers described in U.S. Pat. No. 3,220,972, the platinum-vinylsiloxane catalysts described in French Pat. No. 1,313,846 and its patent of addition thereto, No. 88,676, and French Pat. No. 1,480,409, and also the complexes described in U.S. Pat. Nos. 3,715,334, 3,775,452 and 3,814,730, and a rhodium-containing catalyst such as that described in U.S. Pat. Nos. 3,296,291 and 3,928,629.

The preferred metals of the platinum group are platinum and rhodium, with ruthenium also falling within this category although less active, since it is less costly.

The inhibitors according to the invention give particularly desirable results with platinum-vinylsiloxane complexes, especially the complex with 1,3-divinyl-1,1,3,3-tetramethyldisiloxane, and with platinum-methylvinylcyclotetrasiloxane complexes, especially the platinum-1,3,5,7-tetramethyl-1,3,5,7-tetravinylcyclotetrasiloxane complex.

The amount of catalyst complexes and of inhibitor to be added depends in particular upon the compositions, the type of catalyst and the application intended, and those skilled in this art can readily determine this amount. For coating compositions, the catalyst content typically ranges from about 5 to 1,000 ppm, and preferably from 20 to 100 ppm (calculated as the weight of the previous metal).

The amount of inhibitor typically ranges from 0.01 to 3%, and for the solvent-free coating compositions it preferably ranges from 0.05 to 2% relative to the total weight of the composition.

It has also been determined according to the invention that very small amounts of inhibitor enable the pot life to be exceptionally prolonged in solvent-free compositions intended for the anti-adherence treatment of paper, without thereby adversely affecting the hardening time of the composition when hot, these compositions being maintained at ordinary ambient temperature, namely, below 40°–45° C. and preferably below 25° C.

The cross-linking reaction which typically takes place at from 60° to 130° C., and preferably from 90° to 110° C., can be initiated or even carried out to completion by means of infra-red lamps or using a microwave oven or by U.V. irradiation, but in any event a forced-air oven can be used.

Within the scope of the present invention, any inhibitor (4) can be used which corresponds to the general definition given above, and particularly the organosilicon derivatives.

The inhibitors according to the invention advantageously have the general formula (A):

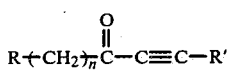
(A)

in which n is an integer ranging from 0 to 10, preferably ranging from 1 to 5, R is a linear or branched chain alkyl radical having from 1 to 10 carbon atoms, an alkenyl radical having from 2 to 4 carbon atoms, a phenyl radical, a cycloalkyl radical having from 4 to 8 carbon atoms, an organosilyl radical selected from among the trialkylsilyl and trialkoxysilyl radicals in which the alkyl moiety has from 1 to 4 carbon atoms or a halogen atom selected from among chlorine, bromine and iodine, and R' is a hydrogen atom, an alkyl radical having from 1 to 4 carbon atoms, an α-hydroxyalkyl radical having from 1 to 4 carbon atoms, an alkylcarbonyl radical in which the alkyl moiety contains from 1 to 6 carbon atoms, a benzoyl radical, a benzoylalkyl radical in which the alkyl moiety contains from 1 to 6 carbon atoms, and an organosilyl radical selected from among the trialkylsilyl and trialkoxysilyl radicals in which the alkyl moiety has from 1 to 4 carbon atoms.

The inhibitors which are even more preferred according to the invention are those which have a genuine alkyne structure and which correspond to the general formula (B):

(B)

in which n denotes an integer ranging from 1 to 15, preferably from 3 to 10 and X denotes a halogen atom selected from among the chlorine, bromine and iodine atoms.

Compounds having the formulae (A) and (B) are generally known materials, the synthesis of which is, for example, described in French Pat. No. 1,324,312, in M. Barrelle and R. Glenat, *Bulletin de la Societe Chimique de France*, No. 2, p. 453 (1967), in E. R. Jones, *Journal of Chemical Society*, p. 39 (1946) and Birkofer, *Chem. Ber.*, volume 96, p. 3280 (1963). In the case where the products corresponding the the formulae (A) and (B) are new compounds, those skilled in the art will have no difficulty in the synthesis thereof by applying the processes described in the four references mentioned above.

Such inhibitors are preferably selected from among the following compounds:

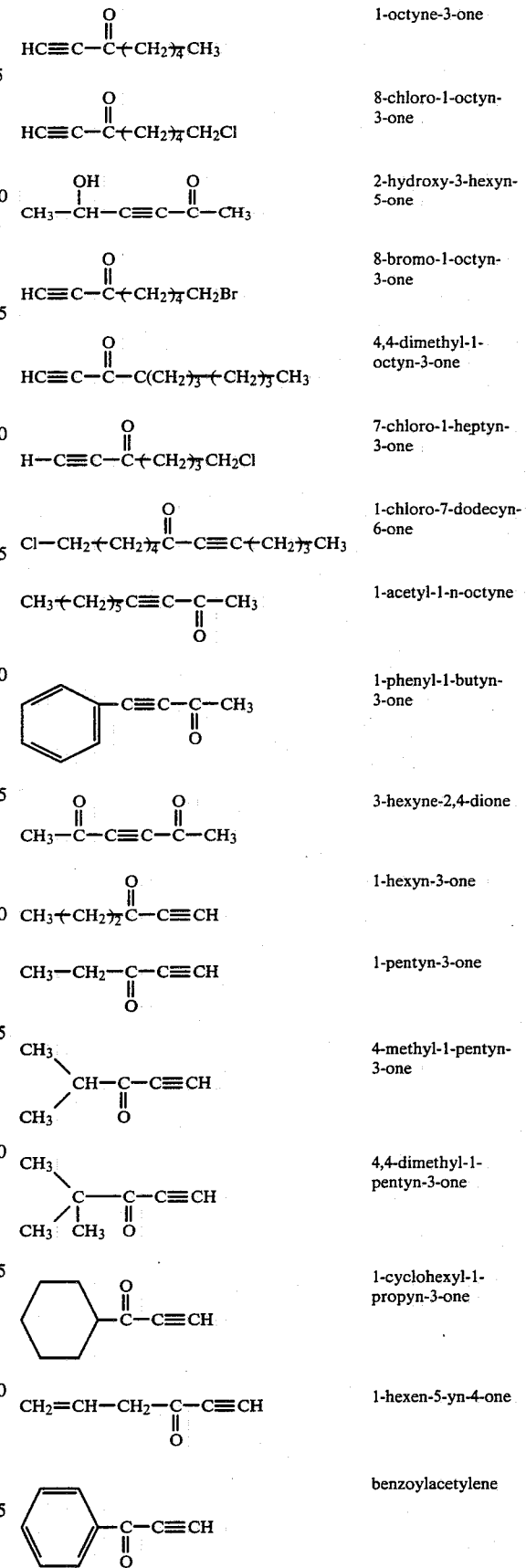

-continued

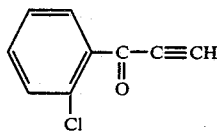  o-chlorobenzoyl-acetylene

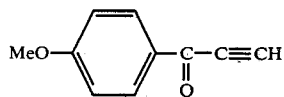  p-methoxybenzoyl-acetylene

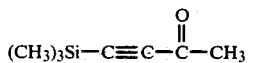  1-trimethylsilyl-1-butyn-3-one

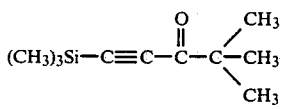  1-trimethylsilyl-4,4-dimethyl-1-pentyn-3-one

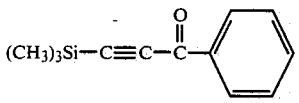  1-trimethylsilyl-2-benzoylacetylene

In order to further illustrate the present invention and the advantages thereof, the following specific examples are given, it being understood that same are intended only as illustrative and in nowise limitative.

EXAMPLE 1

A treatment bath was prepared according to the following procedure:

(1) 100 parts of a silicone composition were used, which comprised:
 (a) 90.5% of a polydimethylsiloxane copolymer having vinyl units in the chain and a dimethylvinylsiloxy end-group, including approximately 3% by weight of vinyl groups and possessing a viscosity of approximately 250 mPa.s at 25° C.;
 (b) 2.5% of 1,3,5,7-tetramethyl-1,3,5,7-tetravinylcyclotetrasiloxane; and
 (c) 7% of a polymethylhydrosiloxane fluid having a trimethylsiloxy end-group, used as a cross-linking agent and containing approximately 1.5% by weight of hydrogen atoms bonded to silicon and having a viscosity of approximately 20 mPa.s at 25° C.

To this composition were added:

(2) 60 ppm of platinum ($3 \times 10^{-4}$ gram-atom of Pt per kg of composition) in the form of a platinum complex prepared from chloroplatinic acid and 1,3-divinyl-1,1,3,3-tetramethyldisiloxane, as described in U.S. Pat. No. 3,814,730; and (3) 0.5% by weight of 1-octyn-3-one, equivalent to $4.1 \times 10^{-2}$ mole/kg of composition.

The mixture was vigorously stirred at ambient temperature for a few minutes and this mixture was then, in the absence of solvent, deposited onto a paper sheet (approximately 1 g of mixture per m²) by means of a coating rod, and the silicone composition was hardened in a forced-air circulation oven maintained at 110° C.

The hardening or curing of the silicone coating was thus evaluated by noting the minimum residence time in the oven required to obtain a fully-hardened coating. The increase in viscosity over time was also measured for the composition of the catalyzed bath, to judge the efficiency of the α-acetylenic ketones as inhibitor. The results are reported in the Table I which follows.

EXAMPLES 2 to 10

The procedure of Example 1 was repeated, except that a different inhibitor was selected; the results are reported in Table I below:

TABLE I

| Nature of the inhibitor | Concentration of the inhibitor in the resin | | Hardening time at 110° C. (sec) | Gelation time at 20° C. in h and min |
|---|---|---|---|---|
| | % by weight | mole/kg | | |
| none | none | none | 10 | 30 min |
| 1-octyn-3-one | 0.25% | $2.1 \times 10^{-2}$ | 10–12 | 7 h |
| 1-octyn-3-one | 0.50% | $4.1 \times 10^{-2}$ | 10–12 | 14 h |
| 1-octyn-3-one | 0.63% | $5.0 \times 10^{-2}$ | 12 | 25 h |
| 8-chloro-1-octyn-3-one | 0.22 | $1.4 \times 10^{-2}$ | 15 | 4 h |
| 8-chloro-1-octyn-3-one | 0.50 | $3.0 \times 10^{-2}$ | 15 | 10 h |
| 8-chloro-1-octyn-3-one | 0.68 | $4.1 \times 10^{-2}$ | 15 | 19 h |
| 8-chloro-1-octyn-3-one | 0.73 | $4.6 \times 10^{-2}$ | 18 | 24 h |
| 2-hydroxy-3-hexyn-4-one | 0.50 | $4.5 \times 10^{-2}$ | 15 | 60 h |
| 1-trimethyl-silyl-1-butyn-3-one | 0.70 | $5.6 \times 10^{-2}$ | 10 | 3 h |
| 1-trimethyl-silyl-1-butyn-3-one | 1.37 | $9.8 \times 10^{-2}$ | 15 | 18 h |
| 1-acetyl-1-octyne | 0.30 | $2.0 \times 10^{-2}$ | 10 | 1 h |
| 1-acetyl-1-octyne | 1.50 | $9.8 \times 10^{-2}$ | 10 | 3 h, 30 min |
| 1-phenyl-1-butyn-3-one | 0.30 | $2.0 \times 10^{-2}$ | 15 | 1 h |
| 1-phenyl-1-butyn-3-one | 1.00 | $7.0 \times 10^{-2}$ | 10 | 5 h |
| 1-trimethyl-silyl-4,4-dimethyl-1-pentyn-3-one | 0.92 | $5.1 \times 10^{-2}$ | 10 | 4 h |
| 1-trimethyl-silyl-4,4-dimethyl-1-pentyn-3-one | 1.40 | $7.7 \times 10^{-2}$ | 10 | 6 h, 30 min |
| 1-trimethyl-silyl-4,4-dimethyl-1-pentyn-3-one | 2.50 | $14.0 \times 10^{-2}$ | 15 | 21 h |
| 1-trimethyl-silyl-2-benzoylacetylene | 0.57 | $2.9 \times 10^{-2}$ | 10 | 2 h, 45 min |
| 1-trimethyl-silyl-2-benzoylacetylene | 1.51 | $7.5 \times 10^{-2}$ | 15 | 9 h |
| 1-trimethyl-silyl-2-benzoylacetylene | 2.10 | $10.4 \times 10^{-2}$ | 15 | 25 h |

EXAMPLE 11

To the silicone composition of Example 1 were added 60 ppm of rhodium in the form of a bis(ethylene)rhodium acetylacetonate complex $(C_2H_4)_2Rh(CH_3COCHCOCH_3)$, described in U.S. Pat. No. 3,928,629, and 0.4% of 1-octyn-3-one.
 (i) Hardening time at 110° C.: 20 seconds
 (ii) Gelation time at 20° C.: 9 hours
 (iii) Gelation time at 20° C. without inhibitor: 30 minutes

EXAMPLE 12

In this example, a composition was used which was identical to that of Example 1, except that it included 0.6% by weight of the inhibitor 8-chloro-1-octyn-3-one. This composition was applied, in the proportion of 0.8 g/m², in a uniform layer onto one side of a Kraft paper weighing 67 g/m² (prepared from a pulp beaten to a freeness of 70° Shopper), surface-coated with a barrier layer of carboxymethylcellulose and supercalendered. The deposition of the layer was carried out by means of a coating head of the transfer coating type, mounted on an industrial paper-coating machine. The deposited layer was hardened by passing the coated paper at the speed of 180 m/minute into a tunnel furnace of the machine, adjusted to 110° C., the time of passage of the paper being 15 seconds.

On the side of the paper covered with a thin coating of hardened silicone, there were deposited, by means of a casting unit, 60 g/m² of a 40% strength solution in ethyl acetate of an adhesive acrylic polymer marketed under the trademark SOLURON A 1030 E. The paper covered with the adhesive solution was placed for 3 minutes in a ventilated oven adjusted to a temperature of 130° C., and was maintained for 15 minutes at room temperature. A layer of 24 g/m² of adhesive remained on the paper.

Onto this layer was next applied a polyethylene terephthalate film. This was maintained in place for 24 hours under a pressure of 24 g/cm². After this time, the force needed to peel the film from the paper was measured; the peeling was carried out by means of a dynamometer, one of the two jaws of which was fixed, which held the paper, and the other pulled on one end of the film, which was folded back over 180°, at a rate of 25 cm/minute. A low peel strength was determined: 2.0 g for a film width of 1 cm.

In addition, the viscosity of the bath used for the coating varied from 300 mPa.s to 400 mPa.s over 7 hours. Gelation only occurred 24 hours after the introduction of the platinum catalyst into the composition.

EXAMPLE 13

The same composition was used as in Example 7, except that the catalyst was the reaction product of chloroplatinic acid with octanol, according to U.S. Pat. No. 3,220,972, the quantity of platinum being maintained at 60 ppm of platinum metal.

Exactly the same test was carried out as in Example 7, and a peel strength of 2 g for a 1 cm film width was also determined.

In addition, the viscosity of the bath used for the coating varied from 280 mPa.s to 450 mPa.s over 7 hours. Gelation only occurred 24 hours after the introduction of the platinum catalyst into the composition.

EXAMPLES 14 TO 20

To 100 g of polydimethylsiloxane oil having a viscosity of 600 mPa.s at 25° C. and comprising a dimethylvinylsiloxy end-group (0.4% by weight of vinyl groups) were added 41.5 g of fumed silica having a specific surface of 300 m²/g, surface treated with hexamethyldisilazane. To this paste was added an organosilicon composition containing 4 g of a polydimethylsiloxane copolymer containing hydromethylsiloxy units in the polymer chain (0.24% by weight of hydrogen atoms bonded to silicon) and containing approximately 120 silicon atoms per molecule and 4 g of a polydimethylsiloxane polymer comprising dimethylhydrosiloxy endgroups, having a viscosity of 30 mPa.s at 25° C.

To this composition were added a platinum-based catalyst and an inhibitor which was 8-chloro-1-octyn-3-one.

In Examples 14 to 16, the catalyst employed was the same as that employed in Example 13. In Examples 17 to 20, the catalyst employed was the same as in Example 1.

Cross-linking time was ascertained by hand, by feel of a 500 μm thick film of the composition which was coated onto polyethylene-coated paper.

The results are reported in Table II which follows:

TABLE II

| Examples | Inhibitor concentration % | Platinum concentration | Crosslinking time 120° C. | Crosslinking time 150° C. | Bath stability ("pot life") |
|---|---|---|---|---|---|
| 14 | 0.096 | 12 ppm | — | 1 min | 16 days |
| 15 | 0.066 | 12 ppm | — | 1 min | 3 days |
| 16 | 0.19 | 6 ppm | — | 1 min, 30 sec | >1 month |
| 17 | 0.096 | 12 ppm | — | — | >1 month |
| 18 | 0.066 | 12 ppm | 1 min, 30 sec | 1 min | 21 h |
| 19 | 0.082 | 6 ppm | 1 min, 30 sec | 1 min | 1 month |
| 20 | 0.053 | 6 ppm | 1 min, 30 sec | 1 min | 5 days |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An organopolysiloxane composition of matter which comprises:
   (1) at least one organopolysiloxane comprising at least one vinyl radical per molecule, the remaining radicals thereof comprising mono- or divalent organic radicals which do not adversely affect the platinum group metal catalytic cross-linking thereof;
   (2) at least one organohydropolysiloxane comprising at least three hydrogen atoms bonded to silicon per molecule, the remaining radicals thereof comprising mono- or divalent organic radicals which do not adversely affect the platinum group metal catalytic cross-linking of said organopolysiloxane (1), wherein the ratio between the hydrogen atoms bonded to silicon in said organohydropolysiloxane (2) and the sum of the vinyl, alkenyl and alkynyl radicals bonded to silicon in said organopolysiloxane (1) is at least 0.5:1;
   (3) from about 5 to 1,000 ppm of a platinum group metal catalyst to cross-link said organopolysiloxane (1) with said organohydropolysiloxane (2); and (4) from about 0.01 to 3% of at least one platinum catalysis inhibitor comprising a ketone compound having a boiling point of at least 25° C., at least one site of acetylenic unsaturation and a carbonyl group in the α-position to the carbon atoms constituting said site of acetylenic unsaturation.

2. The composition of matter as defined by claim 1, wherein said ketone inhibitor (4) has the general formula (A):

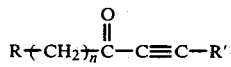
(A)

in which n is an integer ranging from 0 to 10, R is a linear or branched chain alkyl radical having from 1 to 10 carbon atoms, an alkenyl radical having from 2 to 4 carbon atoms, a phenyl radical, a cycloalkyl radical having from 4 to 8 carbon atoms, a trialkylsilyl or trialkoxysilyl radical, the alkyl or alkoxy moieties of which having from 1 to 4 carbon atoms, or chlorine, bromine or iodine, and R' is an alkyl radical having from 1 to 4 carbon atoms, a hydrogen atom, an α-hydroxyalkyl radical having from 1 to 4 carbon atoms, an alkylcarbonyl radical, the alkyl moiety of which having from 1 to 6 carbon atoms, a benzoyl radical or a benzoylalkyl radical, the alkyl moiety of which having from 1 to 6 carbon atoms, or a trialkylsilyl or trialkoxysilyl radical, the alkyl moieties of which having from 1 to 4 carbon atoms.

3. The composition of matter as defined by claim 1, wherein said ketone inhibitor (4) has the general formula (B):

(B)

in which n is an integer ranging from 1 to 15, and X is chlorine, bromine or iodine.

4. The composition of matter as defined by claim 2, comprising:

(1) an organopolysiloxane which comprises structural units of the average general formula (I):

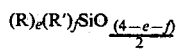
(I)

in which each R is a monovalent hydrocarbon radical having from 1 to 12 carbon atoms, a monovalent halogenocarbon radical having from 1 to 12 carbon atoms and containing from 1 to 4 chlorine and/or fluorine atoms, a cyanoalkyl radical having from 3 to 4 carbon atoms, a cycloalkyl or halogenocycloalkyl radical having from 3 to 8 carbon atoms and containing from 1 to 4 chlorine and/or fluorine atoms, an aryl, alkylaryl or halogenoaryl radical having from 6 to 8 carbon atoms and containing from 1 to 4 chlorine and/or fluorine atoms, R' is a vinyl, allyl, methallyl, butenyl, pentenyl, ethynyl, propynyl or butynyl radical, and e and f are as defined below; and (2) an organohydropolysiloxane which comprises structural units of the average general formula (II):

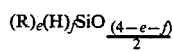
(II)

in which R is as defined above, e is a number ranging from 0.5 to 2.49 and f is a number ranging from 0.001 to 1, with the sum of e plus f ranging from 1.0 to 2.5.

5. The composition of matter as defined by claim 4, wherein said organopolysiloxane (1) comprises a copolymer of the general formula (III):

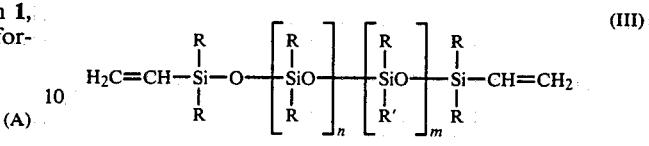
(III)

in which R is methyl and R' is vinyl, the viscosity of which ranges from 40 to 100,000 mPa.s at 25° C., and n and m are integers such that the content of vinyl groups does not exceed 10% by weight, with the proviso that m optionally may be 0.

6. The composition of matter as defined by claim 4, wherein said organohydropolysiloxane (2) has the following general formula (IV):

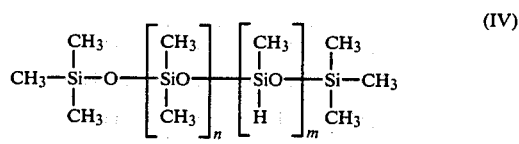
(IV)

the viscosity of which ranges from 40 to 100,000 mPa.s at 25° C., and n and m are integers such that the content of hydrogen atoms bonded to silicon does not exceed 1.65% by weight, with the proviso that n optionally may be 0.

7. The composition of matter as defined by claim 1, further comprising, per 100 parts by weight of the organopolysiloxanes (1) and (2), from 1 to 20 parts by weight of (5) a linear polysiloxane containing two hydrogen atoms bonded to silicon per molecule, with no silicon atom having more than one hydrogen atom bonded thereto, the organic radicals comprising said organosiloxane (5) being methyl, ethyl, phenyl or 3,3,3-trifluoropropyl radicals.

8. The composition of matter as defined by claim 1, wherein said platinum group metal catalyst (3) comprises platinum or rhodium.

9. The composition of matter as defined by claim 1, adopted to cross-link at a temperature above 80° C.

10. The composition of matter as defined by claim 4, dispersed in a volatile organic solvent compatible therewith, and wherein the ratio of the hydrogen atoms bonded to silicon in said organohydropolysiloxane (2) to the sum of the vinyl, alkenyl and alkynyl radicals bonded to silicon in said organopolysiloxane (1) ranges from 0.5 to 2:1.

11. A solvent-free coating composition of matter as defined by claim 4, having a viscosity not in excess of 5,000 mPa.s at 25° C., and wherein the ratio between the hydrogen atoms bonded to silicon in said organohydropolysiloxane (2) and the sum of the vinyl, alkenyl and alkynyl radicals bonded to silicon in said organopolysiloxane (1) ranging from 0.5:1 to 2:1.

12. An article of manufacture comprising a substrate, said substrate comprising an anti-stick coating layer of the composition of matter as defined by claim 1, in an amount of from 0.1 to 5 g per m² of coated surface.

13. The composition of matter as defined by claim 1, in cross-linked state.

14. The article of manufacture as defined by claim 12, said coating layer being in cross-linked state.

* * * * *